CASE A
NON-FRACTURED

CASE B
FRACTURED

INVENTOR:
J. D. LOREN

INVENTOR:
J. D. LOREN
BY: *Theodore E. Bieber*
HIS ATTORNEY

3,356,177
METHOD FOR DETECTING FRACTURES IN A FORMATION PENETRATED BY A BOREHOLE
Jay D. Loren, Houston, Tex., assignor to Shell Oil Company, New York, N.Y., a corporation of Delaware
Filed June 12, 1964, Ser. No. 374,742
6 Claims. (Cl. 181—0.5)

This invention pertains to logging of boreholes that penetrate earth formations and more particularly, a method by which one may detect the location of fractures in a formation penetrated by a borehole.

In the drilling and completing of oil wells, the borehole penetrates many different types of formations. It is often desirable to know which of these formations are fractured or otherwise disturbed. In addition, at times formations are artificially fractured, for example, by hydraulic pressurization, to increase the productivity of the formation and permit the development of an oil producing formation, and it is desirable to determine the location of these artificial fractures.

In the past, various well logging methods have been used to obtain information that indicates the presence and locations of fractures in the borehole wall. Some of these methods consist of obtaining impressions of the wall of the borehole to depict the outlines of fractures. In addition, photographic methods have been used in an attempt to photograph the wall of the borehole to display the visible evidence of fractures. Similarly, television or other direct photographic methods have been used to transmit visual presentations of the wall of the borehole to a surface location. While all of the above methods are satisfactory to some degree, they require a separate logging operation to obtain the information on fractures and thus involve considerable expense and time. In addition, only a short section of the over-all borehole can be surveyed by the wall impression and the like methods. While this is sometimes satisfactory, oftentimes a large portion of the borehole must be neglected from which it would be desired to obtain information concerning the presence of fractures.

A primary objective of this invention is to provide an acoustic well logging process that indicates depths at which there are abrupt discontinuities, such as fractures, in the earth formation encountered by the borehole of a well.

A further object is to provide a method of producing and utilizing acoustic property information, obtained by repetitively generating acoustic impulses and producing electrical signals corresponding to the acoustic waves that are received in an acoustic logging instrument, in a manner in which the information is indicative of depths at which the borehole wall is fractured.

A further object is to provide a method of obtaining and displaying the information provided by a logging instrument, containing at least one transmitter-receiver measuring interval, to depict a pattern of acoustic wave interference anomalies that are characteristic of a fracture in the wall of a borehole.

A further object is to provide an acoustic well logging system in which a means for comparing the amplitude versus time characteristics of electrical signals corresponding to acoustic wave trains that are adjacently received over a transmitter-receiver measuring interval is connected in parallel with means for measuring and recording acoustic velocity properties. With such a signal comparison means arranged to respond to amplitude versus time differences between adjacently received acoustic wave trains and arranged to record such differences in correlation with the depth at which the waves are received, the composite system records indications of the velocities of the formations and indications of the depths at which the formations produce acoustic wave interference patterns that are characteristic of fractures.

The above and other objects of this invention are attained by operating a specified type of logging system to provide a specified density of sampling within the borehole of a well. The logging system is one which produces a series of acoustic impulses and a series of electrical signals corresponding to the acoustic energy that is thus propagated through the surrounding earth formations. Such a logging system is operated to sample a series of adjacent increments of the surrounding earth formations by propagating an acoustic impulse from a transmitting to a receiving transducer at times at which the depth of either is changed by an increment that is less than about one foot. A series of the resultant acoustic wave trains that are received by the receiver are sampled by producing electrical signals that indicate the amplitude versus time characteristics of the wave trains. Such electrical signals provide indications of any variations in the arrival times of any amplitude anomalies that occur in corresponding portions of the received wave trains. The depths at which the earth formations are abruptly discontinuous along the wall of the borehole are indicated by indicating the depths at which such variations in the arrival times of the amplitude anomalies cause the anomalies to undergo at least one sequential advance through and return within the wave trains of a series of wave trains that are received at a sequence of depths differing by less than about one inch. In general, when such a sampling is effected with an instrument in which the transmitter and receiver positions are fixed and the instrument is advanced into positions close to and beyond a horizontal fracture, the positions of the anomalies move within the wave trains to describe a W along the depth axis of a column of adjacently received wave trains that are displayed in the order of their depths of receptions.

The present invention can be practiced by utilizing existing downhole acoustical logging instruments in conjunction with (1) a sufficiently high coverage of pulses per foot of tool travel, and (2) suitable uphole equipment for processing and displaying the detected acoustic signals or information derived from these signals. When the logging, signal processing and display techniques of the present invention are practiced, a log is obtained which permits easy location of fractures in a borehole wall. The logging, processing and displaying techniques of this invention are preferably optimized to most effectively respond to amplitude anomaly information contained within the acoustic wave trains, which information is characteristic of fractured intervals. The logging is preferably accomplished by repetitively pulsing the transmitter of an acoustic velocity logging tool to generate a series of acoustic pulses at a rate sufficient to provide a sample density of at least about twelve pulses per foot of travel of the tool through the borehole. However, since the sample density used governs the quality of the resulting log, the minimum acceptable sample density may be higher in some logging circumstances. The acoustic pulses are detected at a receiver located a fixed distance from the transmitter and the received pulses are converted to related electrical signals. The related electrical signals are preferably transmitted to the surface where they are processed and displayed.

By using the processing and displaying techniques of this invention three means are available for producing three types of logs that are each sensitive to the presence of fractures. Each of these logs can be used alone, or any combination of the three can be used in a supplementary manner. The most simple and direct technique of signal display involves impressing successive signals on the face of an oscilloscope from which they are photographed in a manner providing a photographic record sensitive to events occurring within the acoustic wave trains which arise due to the presence of a fracture. To practice the foregoing technique it is necessary that the relationship between the film movement and the pulse rate be such that approximately twenty-five traces are recorded per inch of film, e.g., thirty-five millimeter film. The photographic record is then viewed to locate sections in which anomalous amplitudes within the acoustic wave trains occur in a manner that is predictable from the tool movement and geometrical considerations. It is the close spaced, closely packed recording, e.g., about twenty-five traces or more per inch of film, coupled with the large number of transmitter pulses per foot of hole, e.g., at least about twelve per foot, that renders the amplitude variations easily discernible by routine visual inspection. The second and third techniques of signal processing and displaying necessitate additional uphole instrumentation, but they provide logs that are sensitive, primarily, to the wave types that arise due to the presence of a fracture. In the signal processing aspects of the second and third techniques, the electrical signals corresponding to pairs of received acoustic wave trains, i.e., successively received wave trains or every $n^{th}$ received acoustic wave train (where $n$ is the number of repetitions occurring between the subject pair of signals), are electronically compared to produce electrical signals having amplitude versus time characteristics essentially equaling the difference in the amplitude versus time characteristics of the two signals. This is accomplished by delaying the first of each pair of signals by an integral number, $n+1$, of transmitter repetition times. In such a comparison, the output of the comparator system is zero if no fracture exists to produce an anomaly in the wave trains of one of the compared signals, However, if a fracture exists, and gives rise to known wave types, these waves will make their presence known primarily through amplitude variations occurring at distinct times (dependent upon the spacial relationship between the tool and the fracture) within the acoustic wave trains. As the tool moves in relation to the fracture, the output of the comparator is not zero and it provides evidence of the arrivals with different arrival times (relative to the transmitter pulses) of the interfering wave types. At this point the difference signal can be displayed. Its display on an oscilloscope in a manner described above in connection with the simple direct technique comprises the second type of log. The advantage of this latter photographic record over the former is that the relatively constant signals which tend to obscure the rapidly fluctuating signals have been considerably reduced. The third type of log comprises a curve or digital indication of the electronically measured elapsed times between the transmitter firings and each arrival of the interfering waves that produce anomalies within wave trains that are adjacently received.

The firing of the transmitter can, conveniently, be utilized to trigger a time-measuring device to measure the time interval elapsing between the firing of the transmitter and the arrival of an acoustical impulse (e.g., at the output of the comparator) having sufficient magnitude to generate a related electrical signal that exceeds a preset background level. In such a procedure the time intervals are recorded and remain substantially constant except when the logging tool is located so that the transmitter receiver spacing straddles or is very close to a fracture. In such positions the time intervals between the firing of the transmitter and the arrival of an interfering signal at the receiver follow a predictable pattern that is dependent upon tool location with respect to the fracture.

The above objects and advantages of this invention will be more easily understood from the following detailed description of the preferred embodiments in which.

Figure 1:
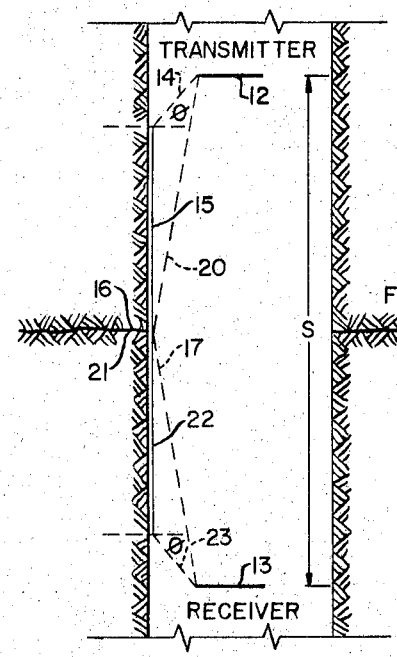
FIGURE 1 is a vertical section of a borehole showing the location of a fracture and the positioning of the transmitter receiver in order to detect the location of the fracture.

Referring now to FIGURE 1, there is shown a representative borehole 9 that penetrates a formation 10 having a fracture 11 disposed therein. The fracture 11 is illustrated as being a horizontal fracture that extends through the formation 10. Disposed within the borehole 9 is a transmitter 12 and a receiver 13 of an acoustical logging system. The transmitter and receiver are separated by a distance S and disposed to straddle the fracture 11. While a single transmitter, single receiver logging tool is illustrated, obviously other configurations could be used. The only requirement for practicing the method of this invention is that during the traverse of a borehole a transmitter receiver combination between which acoustic impulses are repetitively transmitted must approach and straddle the fracture that is to be detected.

One means for understanding the relationship between arrival times of the interfering waves within the acoustic wave train and the location of the logging tool with respect to the fracture is as follows:

The transmitter 12 generates a series of acoustical waves that in turn travel radially outward to the borehole wall. One of these waves is illustrated by the vector 14 that travels as a compressional wave through the liquid filled borehole 9. The wave then travels along the borehole wall as a compressional wave 15 until it reaches the upper corner or edge 16 of the fracture 11. A portion of the energy contained in the compressional wave traveling along the holehole wall then energizes the corner 16 as a secondary source from which acoustic energy is radiated. In particular, a new wave 17 is generated which travels from the corner 16 to the receiver 13, with the velocity characteristic of compressional waves within the borehold fluid.

In addition to the path outlined above, some of the acoustic energy from the transmitter 12 will travel along a path 20 with the velocity of the fluid compressional wave, excite the lower edge 21 of the fracture 11 as a secondary source, which in turn generates a compressional wave 22 traveling through the formation 10. This wave will then leave the formation at the critical angle, $\theta$, and travel as a compressional wave 23 through the borehole fluid to receiver 13. The detection of these two wave types, which shall be collectively referred to as diffracted waves, is an element of this invention.

From a study of the above outlined paths, it is easy to see that when the receiver is directly opposite the fracture the first of the above wave types (traveling via paths 14, 15 and 17) will arrive within the detected acoustic wave train at a time very close to the arrival time of the refracted compressional wave normally encountered within an unfractured portion of the borehole (e.g., traveling via paths 14, 15, 22 and 23). The second of the above two wave types (traveling via paths 20, 22 and 23) will, however, arrive within the acoustic wave train at a time slightly later than the arrival time of the direct fluid wave. Conversely, when the transmitter is opposite the fracture, the arrival times of the two wave types will be interchanged within the acoustic wave train. Referring to FIGURE 1, it is easy to see that when the transmitter 12 and receiver 13 are symmetric about the fracture 11, the arrival time of the wave having paths 14, 15 and 17 as components will be identical to the arrival time of the wave having paths 20, 22 and 23 as components. Further, if the transmitter is a farther distance from the fracture than is the receiver, the wave with paths 14, 15 and 17 will precede within the acoustic wave train the wave with paths 20, 22 and 23 as components. Of course, if the receiver is a farther distance from the fracture than is the transmitter, the order of arrival times of these two wave types will be reversed.

Figure 2:
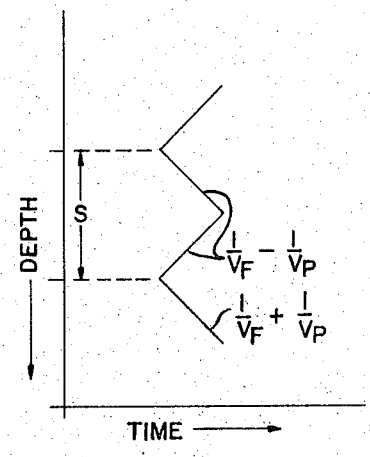
FIGURE 2 illustrates the relationship between arrival time of the interfering wave types which arise due to the presence of a fracture and the depth of the logging tool with respect to the fracture.

The relationship between arrival times within the acoustic wave train of the above two wave types as a function of logging tool location is schematically illustrated in FIGURE 2, where attention is concentrated on only the earliest arriving of the two types of diffracted waves. For example, if the logging tool of FIGURE 1 is visualized as moving in an upward direction and approaching the fracture from below, the wave types associated with paths 20, 22 and 23 will be the earliest arriving diffracted wave. Analysis of the problem shows that the arrival time of this wave will sequentially advance in time through the wave train per increment of tool movement at a rate approximately equal to the sum of the reciprocal velocities of compressional waves within the fluid and the solid ($1/VF + 1/VP$). Subsequent to the transmitter passing the fracture, the same wave type will sequentially decline in arrival time at a rate approximately equal to the difference between the reciprocal velocities of fluid and solid compressional waves ($1/VF - 1/VP$). As the logging tool passes the point where the transducers are symmetric about the fracture, the earliest of the diffracted waves becomes that characterized by paths 14, 15 and 17, and this wave type exhibits a sequential advance through the wave train at a rate approximately equal to the difference between the reciprocal compressional wave velocities within the fluid and solid. Continuing tool movement upward so that the entire logging tool is above the fracture causes this same wave type to decline in time at a rate approximately equal to the sum of the reciprocal velocities of compressional waves within the fluid and the solid. One objective of this invention is to detect the characteristic pattern (or portion thereof) shown schematically in FIGURE 2.

Figure 3:
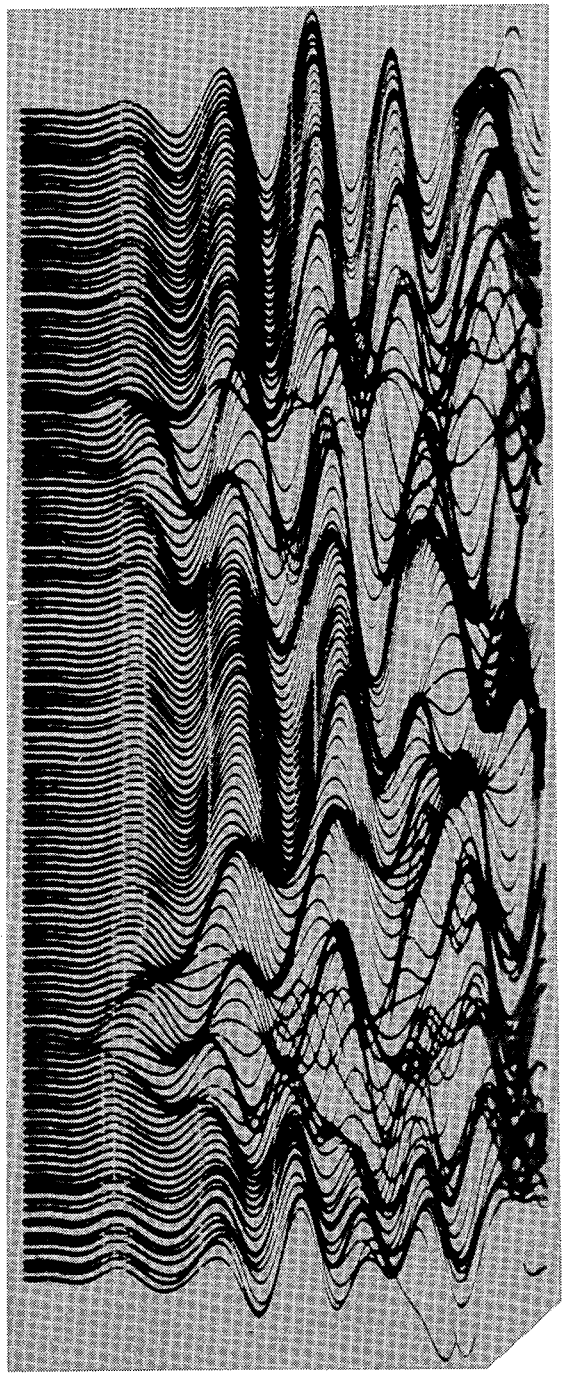
FIGURE 3 illustrates the type of records obtained with the simplest of the processing and display techniques as a single transmitter, single receiver logging tool is moved past a fracture.

Keeping in mind the above discussion, reference is now made to FIGURE 3 wherein typical receiver signals are shown as a single transmitter, single receiver logging tool is moved past a horizontal fracture. The recordings of FIGURE 3 illustrate the simplest of the techniques of this invention, that is direct photographic recording of the received signals available at the surface after downhole detection, amplification, and transmission up the logging cable. Through proper application of this invention in the simplest of its forms, the interference patterns created by the diffracted waves are extremely well pronounced, and fractured formations can be differentiated from non-fractured formations by simply observing the presence or absence of the interference patterns. It is easily apparent from FIGURE 3 that the arrival time of the interference within the acoustic wave train follows the trend illustrated in FIGURE 2 and discussed above. The recording of FIGURE 3 is an example of one of the techniques of this invention. Here a downhole repetition rate of 40 pulses per foot of formation logged, coupled with a proper photographic display of 50 traces per inch of 35 millimeter film, resulted in a recording whereby visual inspection could be employed to instantaneously recognize the presence of the interfering wave types.

Figure 4:
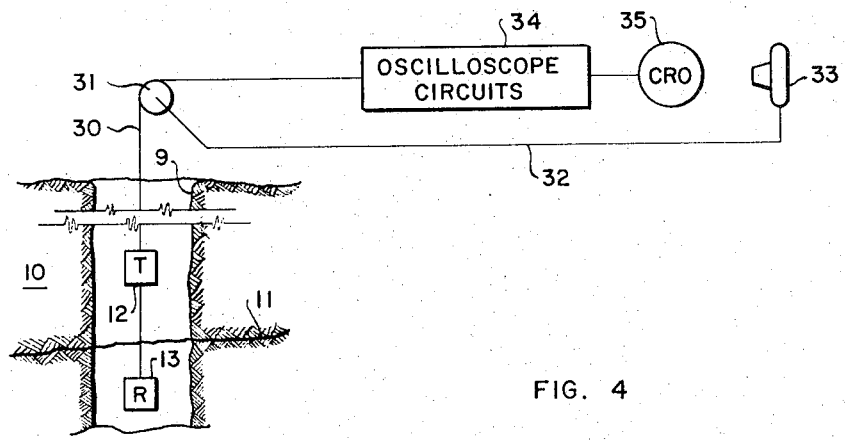
FIGURE 4 illustrates a type of logging system used when the simplest of the display techniques is used.

Referring now to FIGURE 4 there is shown an acoustical velocity logging system for obtaining the record shown in FIGURE 3. More particularly, in FIGURE 4 the transmitter 12 and receiver 13 are shown suspended in a borehole at the end of cable 30. The borehole formation 10 is shown as having a fracture 11 that traverses the formation in a horizontal plane. The cable 30 at the surface passes over a measuring sheave 31 which is coupled to a suitable selsyn to determine the location of the downhole tool in the borehole. The output of the selsyn is coupled by means of a lead 32 to the film advance control circuits of the camera 33. Cable 30 is coupled to an oscilloscope circuit 34 whose output is coupled to a cathode ray oscilloscope 35. The oscilloscope circuits are arranged so that when the transmitter 12 is pulsed to generate an acoustical impulse the horizontal sweep of the oscilloscope is started and the vertical sweep is controlled by the receiver signal. After the receiver signal is displayed it is photographed by the camera 33 and the film advanced in response to the selsyn signal. This type of logging and recording system is more completely described in a Patent No. 2,651,027 and reference is made to this patent for a more complete description.

Figure 5:
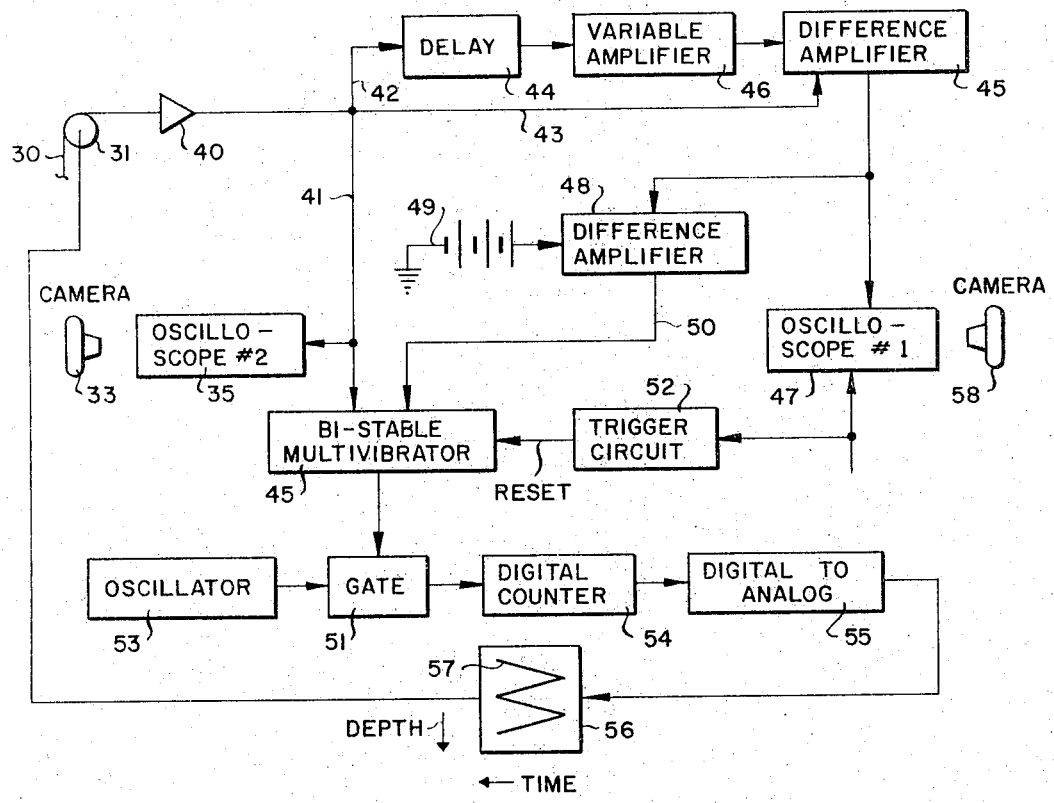
FIGURE 5 illustrates a recording system in which provision is made for emphasizing the interfering waves, thereby permitting either an improved photographic recording to be made, or allowing interval times between transmitter firing and the arrival of the interfering waves to be measured and recorded.

An additional embodiment of this invention is shown in FIGURE 5 in which the downhole logging tool of FIGURE 4 is used. It should be noted that the downhole logging tool may be either a single transmitter, single receiver logging tool or a single transmitter two receiver logging tool. Of course, logging tools having other arrangements of transmitters and receivers can be used with minor modifications of the circuit shown in FIGURE 5. The cable 30 is coupled to an amplifier 40 at the surface which serves to amplify the receiver signals. In the case of a downhole tool having a single transmitter and a single receiver, an electrical pulse indicating the generating of an acoustic impulse by the transmitter can be transmitted to the surface followed by an electrical signal related to the acoustic impulse received by the receiver.

Figure 6:
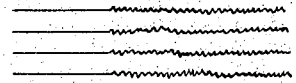
FIGURE 6 illustrates the type of signal obtained by the recording system of FIGURE 5 when no fractures are present.
Figure 7:
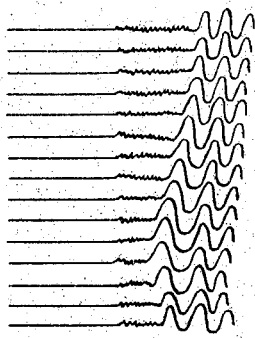
FIGURE 7 illustrates the type of signal obtained by the recording system of FIGURE 6 when a fracture is present.

When a single transmitter two receiver tool is used, the first signal transmitted will represent the first receiver signal and the second signal would represent the complete second receiver signal. It should be noted that to practice the method of this invention it is necessary that the complete electrical signal corresponding to at least one receiver signal must be transmitted to the surface. Thus, the downhole tool cannot supply only a pulse which indicates the time of arrival of the first acoustical energy at a receiver. The output of the amplifier 40 is coupled by means of a lead 41 to a bi-stable multivibrator 45. The bi-stable multivibrator 45 is designed to have two stable states of operation and may be triggered to the opposite state of operation by applying the pulse to an input lead. Thus, when the pulse from the downhole logging tool, for example, a transmitter pulse, is transmitted by the lead 41 to the bi-stable multivibrator, the multivibrator will be triggered to one stable state of operation. The output side of the amplifier 40 is coupled by means of leads 42 and 43 to a delay circuit 44 and a difference amplifier 45 respectively. The delay circuit 44 may be a magnetic tape loop and has a delay period identical to the time between successive pulses of the downhole transmitter. The output side of the delay circuit 44 is coupled to a variable amplifier 46 with the variable amplifier being coupled to the second input of the difference amplifier 45. The difference amplifier will supply an output signal that is the difference between a first receiver signal and a subsequent receiver signal, such as the next succeeding receiver signal. When the downhole tool is located adjacent formations that are free of fractures the two receiver signals will substantially be identical and cancel. When the downhole tool is located adjacent a fracture, the receiver signals will not be identical and will not cancel. The output signal of the difference amplifier when no fractures are present is illustrated in FIGURE 6 while the signal when fractures are present is illustrated in FIGURE 7. As seen in FIGURE 6 only minor variations in the amplitude of the signal occurs as a result of slight differences in the two receiver signals. In contrast when a fracture is present considerable difference in amplitude occurs as shown in FIGURE 7. As explained above with respect to FIGURES 1 and 2, a horizontal fracture will result in a series of anomalies in the receiver signals that shift in time as the downhole tool moves past the fracture. The anomalies will trace a W pattern as shown in FIGURE 2 when the fracture is horizontal.

The output side of the difference amplifier 45 is coupled to an oscilloscope 47 and a second difference amplifier 48. The horizontal sweep of oscilloscope 47 is triggered by the pulse that indicates the generation of an acoustical impulse. The second difference amplifier 48 is also supplied with a reference voltage 49 that may be in the form of a battery and variable potentiometer. The reference voltage 49 is adjusted until it is substantially equal to the voltage of the difference amplifier 45 in the absence of fractures. Thus, the second difference amplifier 48 will only produce an output signal when the signal from the first difference amplifier 45 exceeds the reference voltage 49. This will occur whenever the transmitter receiver combination of the downhole tool is adjacent a fracture. The second difference amplifier 48 is coupled to the second input of bi-stable multivibrator 45 by a lead 50. The bi-stable multivibrator is coupled to a gate circuit 51 to control the opening and closing of the gate. The gate will be opened by the transmitter pulse and closed whenever an output signal is generated by the second difference amplifier 48. To insure that the second multivibrator is returned to its original state a reset pulse is generated by a trigger circuit 52. The trigger circuit 52 generates a reset pulse in response to the transmitter pulse. The reset pulse is delayed by a time interval that is longer than the longest time interval between the transmitter pulse and the receiving of signals resulting from waves that are diffracted by a fracture as explained above. The delay of the reset pulse is of course shorter than the time period for the transmitter.

The gate 51 generates a square wave signal that controls the transmission of pulses from a fixed frequency oscillator 53 to a digital counter 54. The digital counter 54 will count the fixed frequency pulses with the total pulses counted being related to the time interval of the multivibrator 45. The digital counter is coupled to a digital to analog converter 55 that produces an electrical signal related to the total count of the digital counter. The digital to analog converter 55 is coupled to a chart recorder 56 that records the analog signal in the form of a continuous record. The recorder is driven by a signal received from the measuring sheave 31. The recorded signal is thus related to depth and the exact location of a fracture can be determined. The recorder 56 should be adjusted so that the long time intervals that are measured when the output of the second differential amplifier 48 is zero are off scale. When the recorder is adjusted in this manner, the only signal recorded will be the W-shaped signal shown in FIGURE 2 that indicates the presence of a fracture.

Illustrated in FIGURE 6 are the signals of the first difference amplifier 45 for the case when no fractures are present in the formation. As seen in FIGURE 6, the signal has only minor fluctuations and is substantially zero. In FIGURE 7 are illustrated the signals of the difference amplifier 45 when fractures are present in the formation. The signals illustrated in FIGURES 6 and 7 are obtained by displaying the output signal of the difference amplifier 45 on the oscilloscope 47 and photographing the face by means of a camera 58. The film of the camera 58 is advanced in relation to the travel of the downhole tool through the borehole in the same way as the recording system of FIGURE 4.

While two preferred embodiments of this invention have been described, it, of course, can be practiced using other apparatus. The important features of this invention are the repetitive pulsing of an acoustic logging tool to provide sufficient downhole coverage and the indication of variations with depth of the arrival times of differences in the amplitude of corresponding portions of pairs of wave trains that are received within about one foot of each other. This indication may comprise a visual, side-by-side display of the amplitude-versus-time characteristics of a series of the wave trains; and, it is particularly effective where the depths of the traces differ by less than about one inch and at least about 25 traces are included within one inch of the display. Alternatively, or additionally, the indication may comprise a digital, or analog, record of the variations with depth of the time intervals between the generations of the acoustic impulses and the appearances of differences between corresponding portions of pairs of the wave trains that are received. This latter form of indication is advantageous in that it characterizes fractures that may not produce a discernible example of the characteristic W-pattern of diffraction anomaly arrival times that is produced by an isolated horizontal fracture. If an isolated fracture is very steeply inclined, or if many fractures occur within a very short interval, the diffraction arrivals may form a pattern in which the characteristic W's are obscured. But, in such a situation, the occurrence and the variation with depth (in substantially any pattern) of significant differences between the amplitudes of corresponding portions of pairs of traces that are received within not more than a few inches of each other, are indicative of the fractured condition of the wall of the borehole.

I claim as my invention:

1. A process for detecting fractures in formations penetrated by a borehole said process comprising:
    repetitively transmitting acoustic impulses and receiving the resulting trains of acoustic waves between transmitting and receiving transducers located within said borehole;
    moving at least one of the transducers a known increment of not more than about one inch of depth between each of a series of adjacent impulses transmissions;
    detecting the amplitude versus time characteristics of the acoustic impulses received during said series of adjacent impulse transmissions;
    detecting the locations within each received train of acoustic waves of the portions of said received train of acoustic waves that have amplitudes that are anomalous relative to the amplitudes of similarly located portions of adjacently received trains of acoustic waves; and,
    measuring the depths at which the positions of the amplitude anomalies within the received trains of acoustic waves from each of a series of adjacently transmitted acoustic impulses exhibit a sequential advance through the received trains of acoustic waves.

2. A process for detecting fractures in formations penetrated by a borehole, said process comprising:
    repetitively pulsing the transmitter of a transmitter-to-receive logging instrument at a rate sufficient to provide at least about twelve pulses per foot of depth of the section of the borehole being logged;
    visually displaying the amplitude with time characteristics of the trains of acoustic waves that are so received, in the form of a series of side by side analog traces on a record that is advanced in proportion to the depths at which the pulses are produced at a rate that provides at least about twenty-five traces per inch of record, the analog traces having a wave shape related to the received acoustic waves; and detecting the locations within the visually displayed traces where portions of the displayed traces have amplitudes that are anomalous relative to the amplitudes of similarly located portions of adjacent traces.

3. An apparatus for detecting fractures in formations penetrated by a borehole comprising:
   a downhole logging tool having at least a transmitting transducer and a receiving transducer, said transmitting transducer being capable of generating at least one acoustical impulse for each inch of travel of the downhole tool and the receiving transducer receiving the resulting train of acoustical waves and producing an electrical signal that is an electrical analog of the received acoustical waves;
   a surface recording system, a cable means connecting the downhole tool to said surface recording system and moving said downhole tool at a rate at which at least one acoustic impulse is generated for each inch of travel;
   said surface recording system including an oscilloscope and a camera disposed to record the signals displayed on said oscilloscope, the horizontal sweep of the oscilloscope being triggered by generation of each acoustic impulse and the vertical sweep being controlled by said related electrical signal;
   means responsive to the movement of said downhole tool for advancing the film of said camera at a speed to provide the equivalent of at least 25 recorded traces per inch of 35 millimeter film.

4. An apparatus for measuring variations in the time intervals between the generations of acoustic impulses by a transmitting transducer of an acoustical logging tool and the appearances of significant differences between corresponding portions of pairs of the electrical signals related to trains of acoustic waves received at a receiving transducer at depths closer than about one foot, with said receiving transducer being constantly spaced from said transmitting transducer, said apparatus comprising:
   a bi-stable multivibrator, one side of said bi-stable multi-vibrator being coupled to said transmitting transducer;
   a delay means having a delay period equal to the time separation between the generation of an integral number of successive acoustical impulses by said transmitting transducer, said delay means being coupled to the receiving transducer;
   a first difference amplifier having two input terminals, said delay means being coupled to one input terminal of said first difference amplifier, said receiving transducer being coupled to the other input of said first difference amplifier;
   a second difference amplifier having two input terminals, said first difference amplifier being coupled to one input terminal of said second difference amplifier, a reference voltage being coupled to the other input terminal of said second difference amplifier; and
   said second difference amplifier being coupled to the other side of said bi-stable multivibrator whereby the time period of the multivibrator is equal to the time interval between the generation of an acoustic impulse and the time at which the difference between the delayed receiver signal and a subsequent receiver signal exceeds the reference voltage level.

5. An apparatus for detecting the presence of fractures in a formation penetrated by a borehole, said apparatus comprising:
   a downhole acoustic logging tool having at least a transmitting transducer and receiving transducer, said transmitting transducer being capable of generating at least one acoustical impulse for each inch of travel of said downhole tool through said borehole, said receiving transducer being spaced from said transmitting transducer and translating the received train of acoustical waves to an electrical signal that is an electrical analog of the received train of acoustical waves;
   a cable, said cable being connected to said downhole tool to move said tool through said borehole at a rate at which at least one acoustical impulse is generated for each inch of travel, said cable in addition containing circuits supplying power to said tool and transmitting signals from said tool;
   a measuring means, said cable passing over said measuring means for determining the position of the downhole tool within the borehole;
   a surface recording system, said cable being connected to said recording system, said recording system including means to measure when the difference between a pair of receiver signals exceeds a preset level, said recording system also including means to measure and record the time elapsing between the generation of an impulse and the point at which the difference between the pair of receiver signals exceeds the preset level, said recording being related to the position of the downhole tool within the borehole.

6. An acoustic well logging process in which an instrument containing at least one acoustic transmitter and receiver is operated at measured depths within the borehole of a well to repetitively transmit acoustic impulses, receive the resultant waves of acoustic energy and produce receiver signals that are electrical analogs of the received waves, which process comprises:
   producing said acoustic impulses and receiver signals at each of a series of depths that differ by less than about one inch;
   indicating the amounts of delay between the production of each acoustic impulse and the appearance of an amplitude anomaly in the corresponding receiver signal, said delays being measured between the production of each acoustic impulse and the point where the differences between the amplitudes of a pair of receiver signals exceeds a preset level, where the pair of receiver signals are received at depths separated by less than about one inch; and
   indicating the depths at which said acoustic impulses and receiver signals are produced, whereby indications are provided of the depths at which variations in said delays cause the appearances of said anomalies to sequentially move through and return within the receiver signals of a series of receiver signals that are received at a series of sequentially altered depths.

References Cited
UNITED STATES PATENTS

| | | | |
|---|---|---|---|
| 2,691,422 | 10/1954 | Summer et al. | 181—.5 |
| 2,708,485 | 5/1955 | Vogel | 181—.5 |
| 2,928,070 | 3/1960 | Palmer et al. | 181—.5 |
| 3,093,810 | 6/1963 | Geyer et al. | 181—.5 |

BENJAMIN A. BORCHELT, *Primary Examiner.*

SAMUEL FEINBERG, *Examiner.*

W. KUJAWA, *Assistant Examiner.*